| (12) | United States Patent<br>Hartmann | (10) Patent No.: US 12,339,184 B2<br>(45) Date of Patent: Jun. 24, 2025 |
|---|---|---|

(54) MAGNETOELASTIC TORQUE SENSOR HAVING A MAGNETISED SLEEVE AS THE PRIMARY SENSOR

(71) Applicant: Schaeffler Technologies AG & Co. KG, Herzogenaurach (DE)

(72) Inventor: Christian Hartmann, Emskirchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 254 days.

(21) Appl. No.: 18/018,906

(22) PCT Filed: Jul. 12, 2021

(86) PCT No.: PCT/DE2021/100606
§ 371 (c)(1),
(2) Date: Jan. 31, 2023

(87) PCT Pub. No.: WO2022/028644
PCT Pub. Date: Feb. 10, 2022

(65) Prior Publication Data
US 2023/0288274 A1 Sep. 14, 2023

(30) Foreign Application Priority Data
Aug. 5, 2020 (DE) .......................... 102020120672.0

(51) Int. Cl.
*G01L 3/10* (2006.01)
(52) U.S. Cl.
CPC .............. *G01L 3/103* (2013.01); *G01L 3/105* (2013.01)

(58) Field of Classification Search
CPC ................................ G01L 3/103; G01L 3/105
See application file for complete search history.

(56) References Cited

U.S. PATENT DOCUMENTS

| 5,353,649 | A | 10/1994 | Henderson et al. | |
|---|---|---|---|---|
| 5,880,379 | A * | 3/1999 | Tanaka | G01L 3/105 73/862.333 |
| 10,444,097 | B2 * | 10/2019 | Raths Ponce | G01L 3/105 |
| 2018/0231425 | A1 * | 8/2018 | Raths Ponce | G01L 3/105 |
| 2023/0341278 | A1 * | 10/2023 | Hartmann | G01L 3/102 |

FOREIGN PATENT DOCUMENTS

| DE | 3407917 | 9/1985 |
|---|---|---|
| DE | 3924910 | 1/1991 |
| DE | 4214368 | 11/1992 |
| DE | 69800903 | 10/2001 |

(Continued)

*Primary Examiner* — Freddie Kirkland, III
(74) *Attorney, Agent, or Firm* — Volpe Koenig

(57) ABSTRACT

A torque sensor for measuring a torque on a shaft using the measuring principle of inverse magnetostriction, on which a magnetised sleeve is fastened as the primary sensor. The sleeve is provided with at least two circumferential portions which are arranged at an axial distance from one another and magnetised in opposing directions and interact in a contactless manner with respective measuring coils arranged fixedly opposite hereto for acquiring measured values. The magnetised sleeve consists of a non-magnetic carrier sleeve part, on the outer lateral surface of which the magnetized circumferential portions are attached by deposition welding of a ferromagnetic material.

12 Claims, 1 Drawing Sheet

(56) References Cited

FOREIGN PATENT DOCUMENTS

| | | |
|---|---|---|
| DE | 102006054179 | 5/2008 |
| DE | 102017121863 | 3/2019 |
| DE | 102017127547 | 5/2019 |
| EP | 0803053 B1 | 8/2002 |
| EP | 1398607 | 3/2004 |
| EP | 3232172 | 10/2017 |
| EP | 3364183 | 8/2018 |
| WO | 95339982 | 12/1995 |

* cited by examiner

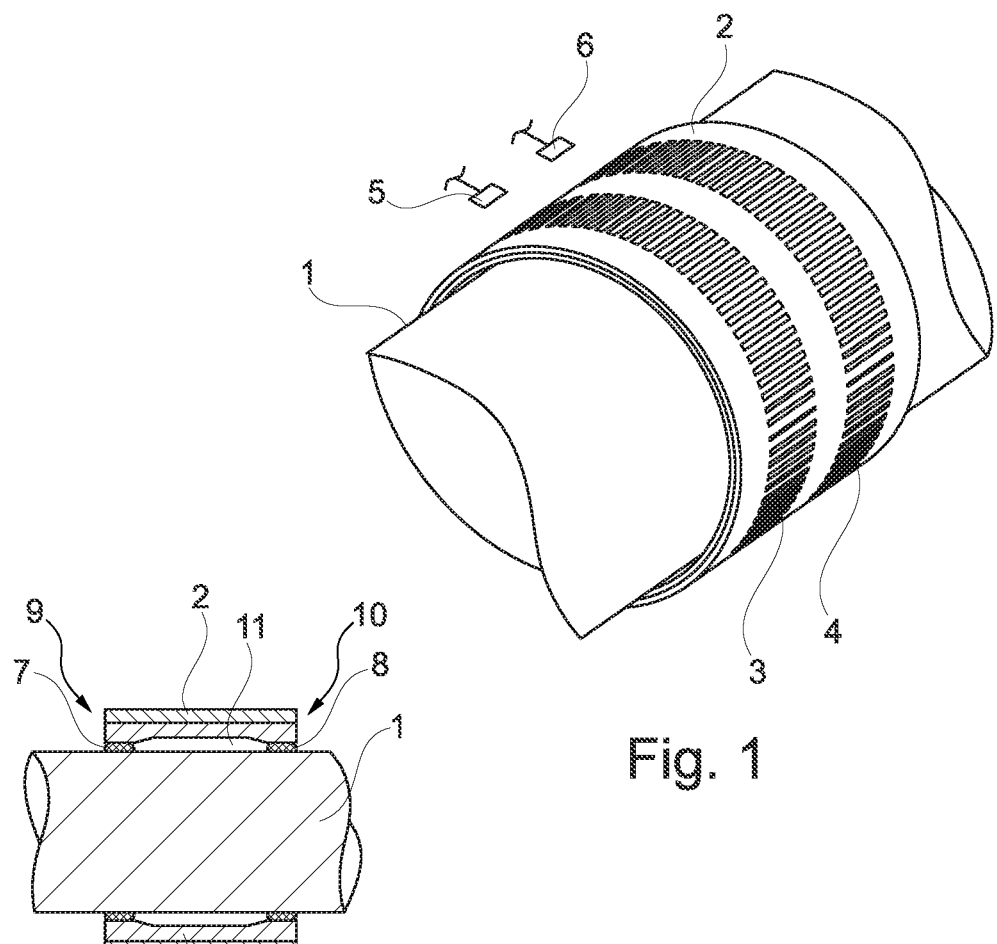
Fig. 1
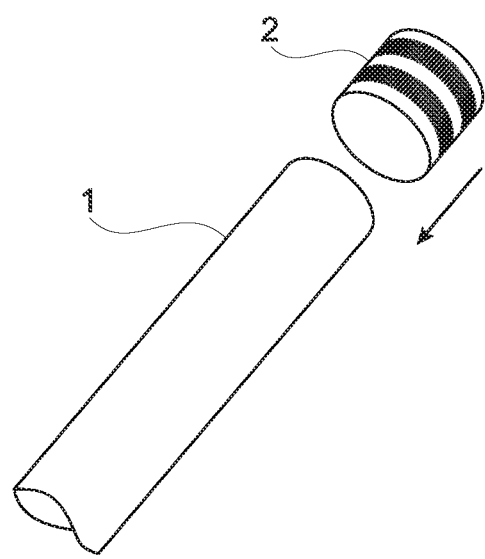
Fig. 3
Fig. 2

MAGNETOELASTIC TORQUE SENSOR HAVING A MAGNETISED SLEEVE AS THE PRIMARY SENSOR

CROSS-REFERENCE TO RELATED APPLICATIONS

This application is the U.S. National Phase of PCT Appln. No. PCT/DE2021/100606, filed Jul. 12, 2021, which claims the benefit of German Patent Appln. No. 102020120672.0, filed Aug. 5, 2020, the entire disclosures of which are incorporated by reference herein.

TECHNICAL FIELD

The present disclosure relates to a magnetoelastic torque sensor for measuring a torque applied to a shaft, wherein a magnetized sleeve is fastened to the shaft as the primary sensor, which sleeve is provided with at least two circumferential portions which are arranged at an axial distance from one another and magnetized in opposing directions and interact in a contactless manner with respective electrical measuring coils arranged fixedly opposite hereto for acquiring measured values.

BACKGROUND

The field of application extends primarily to motor vehicle applications, in particular to torque measurement on transmission shafts, rear axle and front axle differential shafts, E-axles, as well as torque measurement on roll stabilizers, sensor retainer bearings and the like. In principle, such torque sensors can be used on stationary, rotating or moving technical components in order to record the torque acting on them.

The measuring principle of the magnetoelastic torque sensors of interest here is based on a measurement of magnetic field changes due to the application of torque to a component. For this purpose, electrical measuring coils are attached in a contactless manner in relation to the magnetically coded component; for example, a measuring shaft. With this measuring arrangement, changes in the magnetic field can be acquired, which occur under load due to the magnetoelastic effect (inverse magnetostriction) known per se. The measured magnetic field change is directly proportional to the external force acting on the component and thus establishes the connection with the torque.

PRIOR ART

According to the generally known prior art, the torque is usually measured using so-called AMR sensors, which, as measuring coils for acquiring measured values, record the angle of rotation of a shaft or the like. An AMR sensor is a magnetic field sensor that can measure the magnetic field strength based on the anisotropic magnetoresistive (AMR) effect. At one end of the torsion path of the shaft over which the torque is to be measured, a magnetized circumferential portion is arranged, which faces an AMR sensor. A twisting of the torsion path leads to a movement of the magnetized circumferential portion relative to the AMR sensor, as a result of which the direction of the magnetic field changes at the location of the sensor. The torque is then determined in a manner known per se from the relationship between the angle of rotation and the magnetic angle.

Magnetized circumferential portions can be created by directly magnetized components, such as shafts or flanges, or by separate magnetized sleeves made of special sensor materials. These so-called primary sensors are usually pressed onto the shaft over their entire length, which can lead to an uneven stress distribution within the sleeve. As the magnetized sleeve usually has to be quite small in size, only a rather low magnetic flux density to be measured can be generated. Unwanted, assembly-related component stresses further degrade the signal quality.

A generic magnetoelastic torque sensor is known from EP 3 364 183 B1. The torque sensor essentially consists of a shaft which is magnetized in a first axial portion in a first circumferential direction and to which a torque to be measured can be applied, wherein the shaft has a second axial portion which is magnetized in a second circumferential direction which is opposite to the first circumferential direction, a first magnetic field sensor for recording a magnetic field generated by the first portion of the shaft and dependent on the applied torque outside of the shaft and a second magnetic field sensor for recording a magnetic field generated by the second portion of the shaft and dependent on the applied torque outside of the shaft. The magnetic field sensors are designed here as 3D AMR sensors.

It is not always possible to integrate the magnetized circumferential portions serving as primary sensors directly into the shaft, which in this respect has to be made from special sensor materials. Other materials are used, in particular in the application area of transmission technology that is of interest here. For this reason, the approach of a magnetized sleeve as primary sensor instead of directly applied magnetized circumferential portions is pursued for this purpose. This also offers the advantage that any shafts or the like can be equipped with a magnetized sleeve and can serve as the primary sensor.

SUMMARY

It is therefore the object of the present disclosure to further improve a torque sensor with a magnetized sleeve as the primary sensor such that a high signal quality can be achieved with simple technical means.

The object is achieved based on a torque sensor including one or more of the features disclosed herein. The advantageous developments are described below and in the claims.

The disclosure includes the technical teaching that the magnetized sleeve is constructed in two parts and in this respect consists of a non-magnetic carrier sleeve part, on the outer lateral surface of which the magnetized circumferential portions are attached by means of deposition welding of a ferromagnetic material as a basis. In this respect, the magnetized sleeve according to the disclosure is pushed onto the shaft via the non-magnetized carrier sleeve part and fastened there.

By using a non-magnetic carrier sleeve part, which forms a one-piece structural unit with the ferromagnetic material applied thereto, the sleeve thus magnetized is magnetically decoupled from the shaft. This advantageously prevents the magnetic field lines from the magnetized circumferential portions of the applied ferromagnetic material from penetrating into the base material of the shaft, which would reduce the magnetic flux density. The solution according to the disclosure therefore leads to an increase in the external, measurable magnetic flux density, which results in increased sensitivity of the torque sensor according to the disclosure as a result of the magnetic decoupling of the shaft and sleeve that has been achieved. In addition, the magnetic flux distribution over the sleeve length and the sleeve circumference is improved.

The sleeve magnetized according to the disclosure is attached to the shaft via its inner carrier sleeve part, preferably by weld seams or another suitable material connection, which are arranged on both end regions of the carrier sleeve part. The weld seams can be produced by laser welding and are preferably through-welded to, at the same time, prevent dirt and moisture from getting into the region between the inner lateral surface of the carrier sleeve part and the shaft. The welded connection also creates a solid component connection, so that there is no risk of microslippage between the components or an uneven stress distribution over the length of the magnetized sleeve.

According to a further measure improving the disclosure, it is proposed that the outer lateral surface of the shaft and the opposite inner lateral surface of the carrier sleeve part at least partially delimit a clearance gap. The clearance gap should preferably have a gap width of 0.2 to 2 millimeters in order to increase the decoupling effect described above as well as to contribute to saving material on the non-magnetized carrier sleeve part. In this respect, the clearance gap is not filled with other materials and thereby supports the magnetic decoupling.

According to a preferred embodiment of the disclosure, the ferromagnetic material covers the entire length of the carrier sleeve part. The ferromagnetic material thus forms an outer layer of the magnetized sleeve. The ferromagnetic material constitutes, in turn, the material basis for the magnetized circumferential portions formed thereon, which can be produced in a manner known per se by magnetizing via an electrical coil arrangement or strong permanent magnets.

BRIEF DESCRIPTION OF THE DRAWINGS

Further measures to improve the disclosure are shown in more detail below together with the description of a preferred exemplary embodiment based on the figures. In the figures:

FIG. 1 shows a perspective view of a shaft equipped with a torque sensor,

FIG. 2 shows an exploded view of FIG. 1 prior to assembly, and

FIG. 3 shows a schematic longitudinal section through the shaft with the primary sensor of the torque sensor attached thereto.

DETAILED DESCRIPTION

According to FIG. 1, a torque sensor for measuring a torque on a shaft 1 essentially consists of a magnetized sleeve 2 mounted on the shaft 1 as the primary sensor. The magnetized sleeve 2 is provided with two circumferential portions 3 and 4 which are arranged at an axial distance from one another and are magnetized in opposing directions and are designed as permanent-magnet multipole rings. These magnetized circumferential portions 3 and 4 correspond to measuring coils 5 and 6 arranged fixedly opposite thereto for acquiring measured values and further processing measured values according to the known measuring principle of inverse magnetostriction.

As can be seen from FIG. 2, the magnetized sleeve 2 is pushed onto the shaft 1 and then fixedly connected thereto.

According to FIG. 3, the sleeve 2 is fixedly connected to the shaft 1 via weld seams 7 and 8, respectively, which are arranged on both end regions 9 and 10 of the sleeve 2 and are produced by means of laser welding.

Specifically, here a non-magnetic carrier sleeve part 2a of the magnetized sleeve 2 is welded, on the outer lateral surface of which a ferromagnetic material 2b is attached by means of deposition welding, to which the above-described magnetized circumferential portions for torque measurement are introduced.

In addition, the outer lateral surface of the shaft 1 and the opposite inner lateral surface of the carrier sleeve part 2a delimit a clearance gap 11 inside the sleeve, which causes a further improved magnetic decoupling between the ferromagnetic material 2b and the shaft 1.

The disclosure is not restricted to the preferred exemplary embodiment described above. Rather, deviations therefrom are also conceivable that are included in the scope of protection of the following claims. A torque sensor that is magnetized according to the disclosure and at the same time decoupled from the base body can be used for a large number of applications that would otherwise be equipped with more complex measuring systems; for example, based on strain gauges with telemetry.

LIST OF REFERENCE SYMBOLS

1 Shaft
2 Magnetized sleeve
2a Non-magnetic carrier sleeve part
2b Ferromagnetic material
3 First magnetized circumferential portion
4 Second magnetized circumferential portion
5 First measuring coil
6 Second measuring coil
7 First weld seam
8 Second weld seam
9 First end region
10 Second end region
11 Clearance gap

The invention claimed is:

1. A torque sensor for measuring a torque on a shaft based on a measuring principle of inverse magnetostriction, the torque sensor comprising:
a magnetized sleeve fastened to the shaft as a primary sensor, said sleeve including two circumferential portions which are arranged at an axial distance from one another and magnetized in opposing directions;
respective measuring coils arranged fixedly opposite the two circumferential portions that are configured to contactlessly acquire measured values therefrom;
wherein the magnetized sleeve consists of a non-magnetic carrier sleeve part, on an outer lateral surface of which the magnetized circumferential portions include deposition welded ferromagnetic material.

2. The torque sensor according to claim 1, wherein the carrier sleeve part is materially fastened to the shaft via weld seams arranged on both end regions of the carrier sleeve part.

3. The torque sensor according to claim 2, wherein the weld seams are laser weld seams.

4. The torque sensor according to claim 1, wherein an outer lateral surface of the shaft and an opposite inner lateral surface of the carrier sleeve part at least partially delimit a clearance gap.

5. The torque sensor according to claim 4, wherein the clearance gap has a gap width of 0.2 to 2 millimeters.

6. The torque sensor according to claim 1, wherein the ferromagnetic material covers an entire axial length of the carrier sleeve part.

7. A torque sensor for measuring a torque on a shaft based on an inverse magnetostriction measuring principle, the torque sensor comprising:
- a magnetized sleeve fastened to the shaft as a primary sensor, said sleeve including two circumferential portions which are arranged at an axial distance from one another and magnetized in opposing directions;
- respective measuring coils arranged opposite the two circumferential portions that are configured to contactlessly acquire measured values therefrom;
- wherein the magnetized sleeve comprises a non-magnetic carrier sleeve part having an outer lateral surface, and the magnetized circumferential portions include deposition welded ferromagnetic material.

8. The torque sensor according to claim 7, wherein the carrier sleeve part is materially fastened to the shaft via weld seams arranged on both end regions of the carrier sleeve part.

9. The torque sensor according to claim 8, wherein the weld seams are laser weld seams.

10. The torque sensor according to claim 7, wherein an outer lateral surface of the shaft and an opposite inner lateral surface of the carrier sleeve part at least partially delimit a clearance gap.

11. The torque sensor according to claim 10, wherein the clearance gap has a gap width of 0.2 to 2 millimeters.

12. The torque sensor according to claim 7, wherein the ferromagnetic material covers an entire axial length of the carrier sleeve part.

* * * * *